Jan. 19, 1971   J. J. LIEBENBERG   3,556,603
PNEUMATIC CONVEYANCE OF ROD-SHAPED ARTICLES
Filed May 26, 1969

INVENTOR
JOHANNES J. LIEBENBERG
By Young & Thompson
ATTYS.

United States Patent Office 3,556,603
Patented Jan. 19, 1971

3,556,603
PNEUMATIC CONVEYANCE OF ROD-SHAPED ARTICLES
Johannes J. Liebenberg, Johannesburg, Transvaal, Republic of South Africa, assignor to Tobacco Research and Development Institute Limited
Filed May 26, 1969, Ser. No. 827,875
Claims priority, application Republic of South Africa, May 30, 1968, 68/3,473; Sept. 9, 1968, 68/5,779
Int. Cl. B65g 53/00
U.S. Cl. 302—2
5 Claims

ABSTRACT OF THE DISCLOSURE

A device is provided for pneumatically despatching rods at one location and pneumatically conveying them to another location. The device includes a conduit which is connected at its outlet end to a pneumatic terminal and which has two one-way valves in it. The first one-way valve is located near the outlet end of the conduit and means are provided to apply alternately pressure to the forward side of the valve (pressure cycle) and suction to the rear side of the valve (suction cycle). The second one-way valve is located between the inlet end of the conduit and the means for applying suction to the first one-way valve. Means are provided for applying pressure to the forward side of this second valve during the pressure cycle. The rods are arranged in a single vertical row the base of which is off-set from the inlet end of the conduit and alignment means is provided. The alignment means includes means for pneumatically moving a rod at the foot of the row into alignment with the inlet end of the conduit during the suction cycle and means for holding a rod at the foot of the row in the off-set position during the pressure cycle.

---

The present invention relates to the pneumatic conveyance of articles and in particular pneumatic dispatch and conveyance of rod-shaped articles such as cigarettes and filter rods.

Various types of valves, e.g. sliding valves (S.A. Pat. No. 65/3,196) and oscillating valves (S.A. Pat. No. 66/1,528) for doing this have already been proposed.

It is an object of the present invention to provide a simpler device for the pneumatic conveyance and, in particular, for pneumatic dispatch and conveyance of rod-shaped articles such as cigarettes and filter rods.

Accordingly the invention provides a pneumatic conveyance device for articles comprising a conduit, having an inlet end and an outlet end, a first one-way valve in the conduit means for applying pressure to one side of the valve and suction to the other side, a second one-way valve between the inlet end of the conduit and the suction means, and a second pressure applying means between the second one-way and the suction means, the application of suction to the conduit through the suction means being operable to move an article in alignment with the inlet end of the conduit through the first one-way valve and the application of pressure to the conduit through the second pressure applying means being operable to move this article through the second one-way valve for pneumatic conveyance along the conduit characterized in that means are provided for bringing articles arranged in a single vertically inclined row, the base of which row is offset from the conduit, one at a time into alignment with the inlet end of the conduit, the alignment means comprising pneumatic means for moving an article at the foot of the row into alignment with the inlet end of the conduit during the suction cycle and means for holding an article at the foot of the row in the offset position, during the pressure cycle.

Figure 1:
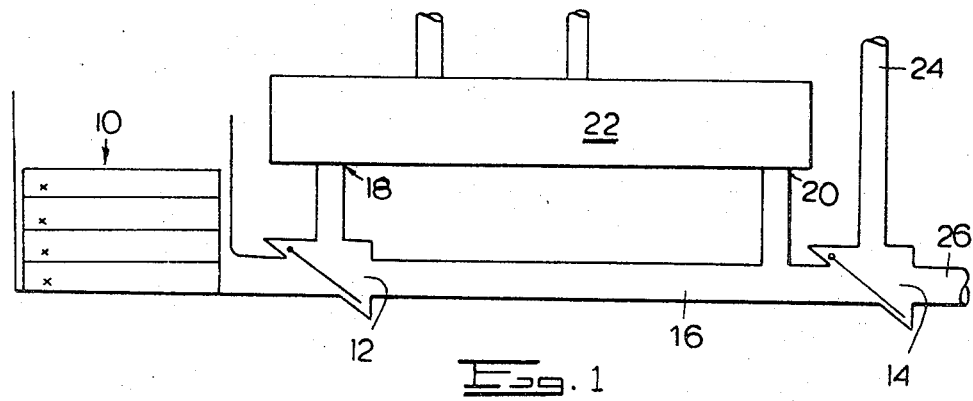
Figure 2:
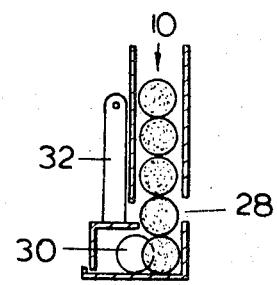
Figure 3:
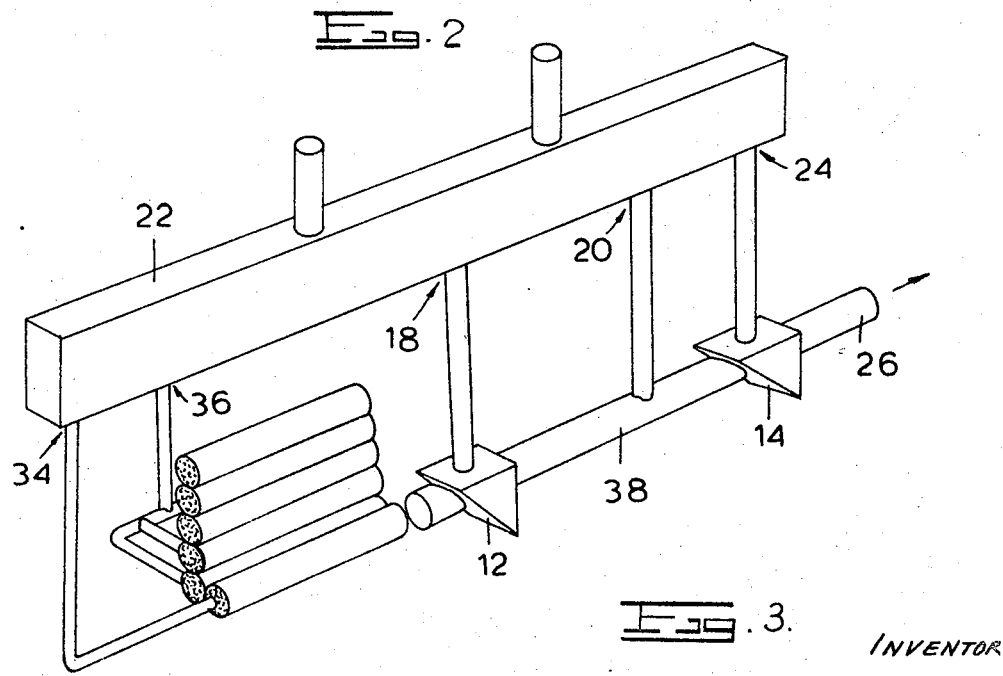

In the accompanying drawings which illustrate by way of example, two preferred embodiments of the invention:

FIG. 1 is a schematic view of one embodiment of the pneumatic conveyance device of the present invention,
FIG. 2 is a schematic sectional view of the slot 10 in FIG. 1, and
FIG. 3 is a schematic pictorial view of a second embodiment of the invention.

Referring to FIG. 1, 10 is a slot in the base of a bin (not shown). The slot is filled with rods in the same manner as described in applicant's oscillating valve patent specification (S.A. Pat. No. 66/1,528). Each slot 10 serves one pneumatic terminal. 12 and 14 are one-way valves. 16 is a conveyance pipe of optimum length for a certain operating speed. 18 and 20 are pressure and suction ports respectively connected to pressure and suction sources via control 22:24 is a pressure source and 26 a pneumatic terminal.

The device operates as follows: rods are located in slot 10 ready for dispatch. As soon as a demand signal is given, control 22 connects port 20 to a negative pressure source, such as a rotary vane vacuum pump. One-way valve 14 closes, 12 opens and a rod is sucked into pipe 16. At this stage port 20 is closed by control 22, and port 18 connected to a high pressure air source. This will cause valve 12 to close and the rod to be forced through one-way valve 14, by this time already opened by the high pressure.

When the rod is en route in the conveying pipe 26, port 18 can be closed by control 22 as long as a compressed air source of pressure is maintained at 24 slightly smaller then at 18.

The rods are presented to the conduit in a single column through slot 10 and a locking device is provided to prevent more than one rod from being handled at a time. Details of such an arrangement are shown in FIG. 2.

FIG. 2 shows a column of rods in a slot 10 with vents 28, a suction hole 30 offset at the base of the slot and a free swivelling locking element 32 on the left side of and above the suction hole. Suction through the suction port 20 will cause the locking element 32 to move to the right across the slot 10 to exercise a lifting action on the rods on top of it so that their weight cannot act upon the bottom rod which is now free to be sucked to the left and into the suction hole 30.

The embodiment illustrated in FIG. 3 has no locking element as shown in FIG. 2. Instead the function of control 22 is extended to accomplish locking by pneumatic means. Locking is necessary to ensure that only one rod is handled at a time.

The function of control 22 is also extended to handle the supply of pressure at port 24.

As before, rods are supplied from a bin into a single column slot at 10. The position of the transport line is offset with respect to the single column slot in order to facilitate the locking action. For this purpose channels 34 and 36 positioned as indicated, are added to control 22.

During the suction cycle control 22 connects 20 and 36 to the suction source 34 and 24 to the pressure source. Therefore, valve 14 closes and 12 opens, and a rod in the offset position is moved under influence of pressure on the one side and suction through 12 until located at 38. The lowest rod in the single column slot is locked in position by suction at 36 and pressure at 34. At this stage the suction cycle function is fulfilled and control can switch to the pressure cycle.

The pressure cycle requires 36 and 18 to be connected to the pressure source. This causes 12 to close, 14 to open and flow through 18 transports the rod, which is still located at 38 through 14 into the delivery line 26. Pressure applied at 36 causes the lowest rod in the single column slot to be blown into the offset position, allowing the column to advance by one.

During the next cycle, which is again a suction cycle, transport of the rod, now in the delivery line 26, is effected by flow through port 24. Thus an even transport flow is maintained in the delivery line.

The preferred control unit is a rotary valve with adequate overlapping between outlets 18 and 24 to allow the required amount of transport flow when stopped in any position.

Feed control may be accomplished by regulating the rotary valve speed and stopping it if no feed is required. Note that this arrangement is quite distinct from previously proposed arrangements since there is no mechanical interruption of rod feed and locking takes place pneumatically.

An alternative method of feed control is to set the rotary valve speed to give the required rate of feed. On-off control is then effected by interrupting the normal function of 36 and keeping it connected to a suction source. In this way the transfer of rods from the single column slot to the offset position during the pressure cycle is prevented and feed is stopped.

Control 22 can be operated by electronic and/or pneumatic means.

The rods presented to the device of the invention must be advanced by correct timing of the pressure ports. Detectors could also be incorporated at appropriate places to facilitate synchronisation of timing.

I claim:

1. A pneumatic conveyance device for articles comprising a conduit, having an inlet end and an outlet end, a first one-way valve in the conduit, means for applying pressure to one side of the valve and suction to the other side, a second one-way valve between the inlet end of the conduit and the suction means, and a second pressure applying means between the second one-way valve and the suction means, the application of suction to the conduit through the suction means being operable to move an article in alignment with the inlet end of the conduit through the second one-way valve and the application of pressure to the conduit through the second pressure applying means being operable to move this article through the first one-way valve for pneumatic conveyance along the conduit and means for bringing articles arranged in a single vertically inclined row, the base of which row is offset from the conduit, one at a time into alignment with the inlet end of the conduit, the alignment means comprising pneumatic means for moving an article at the foot of the row into alignment with the inlet end of the conduit during the suction cycle and means for holding an article at the foot of the row in the offset position, during the pressure cycle.

2. A pneumatic conveyance device as claimed in claim 1 wherein the pneumatic means of the alignment means is adapted to blow an article at the foot of the row into alignment with the inlet end of the conduit during the suction cycle and the means for holding an article at the foot of the row during the pressure cycle is pneumatic means.

3. A pneumatic conveyance device as claimed in claim 2 wherein the alignment means comprises a single pneumatic means adapted to be connected to a source of pressure during the suction cycle and a source of suction during the pressure cycle.

4. A pneumatic conveyance device as claimed in claim 1 wherein the articles are arranged in a single vertical row in a vertical slot, the base of the slot being offset from but in communication with the inlet end of the conduit and being adapted to support the lowermost article in the row, and wherein a locking device is provided which is arranged above the inlet end of the conduit and which, in response to suction applied through the conduit during the suction cycle, is movable from a position to which it is normally biased and in which it is clear of the slot to a position in which it lifts the articles lying above the lowermost article in the row, to free the lowermost article for suction into the inlet end of the conduit during the suction cycle.

5. A pneumatic conveyance device as claimed in claim 4 wherein the locking device is pivotally mounted for movement between its two positions and is gravity biased to its non-lifting position.

References Cited

UNITED STATES PATENTS

| | | | |
|---|---|---|---|
| 1,753,987 | 4/1930 | Hohne | 243—2 |
| 3,089,732 | 5/1963 | Gamberini | 302—2 |

ANDRES H. NIELSEN, Primary Examiner

U.S. Cl. X.R.

243—2; 198—20